(12) United States Patent
Bobinski et al.

(10) Patent No.: US 9,530,013 B2
(45) Date of Patent: Dec. 27, 2016

(54) SUPPORTING THE USE OF A SECRET KEY (71) Applicants: Mike Bobinski, Bonn (DE); Michael Voucko, Frankfurt (DE)

(72) Inventors: Mike Bobinski, Bonn (DE); Michael Voucko, Frankfurt (DE)

(73) Assignee: Deutsche Post AG, Bonn (DE)

( * ) Notice: Subject to any disclaimer, the term of this patent is extended or adjusted under 35 U.S.C. 154(b) by 43 days.

(21) Appl. No.: 14/667,959

(22) Filed: Mar. 25, 2015

(65) Prior Publication Data

US 2015/0199528 A1 Jul. 16, 2015

Related U.S. Application Data (63) Continuation of application No. PCT/EP2014/066716, filed on Aug. 4, 2014.

(30) Foreign Application Priority Data

Aug. 19, 2013 (DE) ........................ 10 2013 108 925

(51) Int. Cl.
*G06F 21/00* (2013.01)
*H04L 29/06* (2006.01)
(Continued)

(52) U.S. Cl.
CPC ............... *G06F 21/602* (2013.01); *G06F 8/61* (2013.01); *H04L 9/0825* (2013.01);
(Continued)

(58) Field of Classification Search
None
See application file for complete search history.

(56) References Cited

U.S. PATENT DOCUMENTS 6,804,663 B1 * 10/2004 Delo .................... G06F 8/61
8,416,954 B1 * 4/2013 Raizen ............. H04L 63/0428
380/277
(Continued)

FOREIGN PATENT DOCUMENTS

DE 44 16 253 B4 11/1995
DE 10 2012 222995 B3 10/2013
GB WO 2014016621 A1 * 1/2014 ......... H04L 63/0823

OTHER PUBLICATIONS

Wikipedia, Oath, webpage encyclopedia, obtained Jul. 10, 2013.
Hardt, "The OAth 2.0 Authorization Framework", book, ISSN: 2070-1721, Oct. 2012, Internet Engineering Task Force (IEFT).

*Primary Examiner* — Farid Homayounmehr
*Assistant Examiner* — Maung Lwin
(74) *Attorney, Agent, or Firm* — Reinhart Boerner Van Deuren P.C.

(57) ABSTRACT

A first installation stores key identifications with allocation to a respective user and a second installation stores secret keys which each can be found by means of a key identification. The first installation authenticates a user who logs onto the first installation via a user device, creates a temporary identifier, allocates the identifier to the user and transmits the identifier to the user device. The second installation receives a request for a secret key from the user device together with the identifier and requests a key identification from the first installation, wherein the received identifier is transmitted. The first installation determines a user allocated to the received identifier, identifies a key identification stored for the determined user and transmits the key identification to the second installation. This second installation determines a secret key based on the received key identification and transmits the secret key to the user device.

20 Claims, 4 Drawing Sheets

(51) Int. Cl.
  *G06F 21/60* (2013.01)
  *H04W 12/04* (2009.01)
  *G06F 9/445* (2006.01)
  *H04L 9/08* (2006.01)

(52) U.S. Cl.
  CPC .......... *H04L 9/0863* (2013.01); *H04L 9/0894* (2013.01); *H04L 63/0815* (2013.01); *H04W 12/04* (2013.01); *H04L 63/067* (2013.01); *H04L 2463/062* (2013.01)

(56) References Cited

U.S. PATENT DOCUMENTS

| | | | |
|---|---|---|---|
| 2003/0070101 A1* | 4/2003 | Buscemi | H04L 63/08 726/8 |
| 2003/0163701 A1* | 8/2003 | Ochi | H04L 9/083 713/175 |
| 2006/0036858 A1* | 2/2006 | Miura | H04L 63/08 713/170 |
| 2006/0174105 A1* | 8/2006 | Park | G06F 21/34 713/155 |
| 2007/0177740 A1* | 8/2007 | Nakajima | G06F 21/6218 380/277 |
| 2007/0261114 A1 | 11/2007 | Pomerantsev | |
| 2008/0235511 A1* | 9/2008 | O'Brien | H04L 9/0844 713/171 |
| 2008/0260149 A1 | 10/2008 | Gehrmann | |
| 2010/0082988 A1* | 4/2010 | Huebner | H04L 9/083 713/171 |
| 2010/0088519 A1* | 4/2010 | Tsuruoka | G06F 21/33 713/176 |
| 2011/0072274 A1* | 3/2011 | Leoutsarakos | H04L 63/0823 713/182 |
| 2011/0162053 A1 | 6/2011 | Pei et al. | |
| 2012/0011578 A1 | 1/2012 | Hinton et al. | |
| 2012/0233684 A1* | 9/2012 | Denis | G06F 21/335 726/9 |

\* cited by examiner

SUPPORTING THE USE OF A SECRET KEY

CROSS-REFERENCE TO RELATED PATENT APPLICATIONS

This patent application is a continuation of PCT/EP2014/066716, filed Aug. 4, 2014, which claims priority to German Application No. 10 2013 108 925.9, filed Aug. 19, 2013, the entire teachings and disclosure of which are incorporated herein by reference thereto.

FIELD OF THE INVENTION

This invention relates amongst other things to methods, apparatuses, systems, programs and storage media for supporting the use of a secret key. The secret key can be, for example, a key for symmetric encryption or a private key of a key pair for asymmetric encryption.

BACKGROUND OF THE INVENTION

Nowadays, data can be sent digitally, for example as an email. For various reasons, conventional emailing is not suitable for confidential information. On the one hand, neither the sender nor the recipient can be unequivocally identified. This means that the recipient of an email cannot be sure that the sender is, in fact, the person or institution who or which is specified as the sender. On the other hand, the information is openly transmitted, which means that wrongly sent emails can be read by the incorrect recipient. In addition, the provider of the email function, via the server of which the email is transmitted, can take note of the information from the email.

The content of electronic messages can be protected by an end-to-end encryption, so that the message cannot be read by any third party when being conveyed from the sender to the recipient. Here, a sender must cryptographically encrypt a message or a part of a message and the recipient must decrypt the message. The encryption can be a symmetric encryption; in this case encryption and decryption are based on the same key. Alternatively, the encryption can be an asymmetric encryption; in this case the encryption can be based on a public key of a key pair of a user and the decryption can be based on a private key of the key pair. Traditionally, the recipient has to manage and protect his key or keys independently, the latter both against a loss as well as against unauthorised reading of a message by a third party. In addition, the recipient has to make the key required to encrypt the message accessible to the sender. The installation of software modules and possibly additional devices, such as card readers, are also required on the part of the recipient.

A trust centre can support the generation and management of keys. In particular, a trust centre can provide recipients with a secure storage of keys, in order to prevent the loss of a key. For this purpose, however, the recipient must not only enter into a contractual relationship with an email provider or another message deliverer but additionally must enter into another contractual relationship with the trust centre. A sender may have to retrieve keys for a plurality of recipients from a plurality of trust centres and make sure that he is in each case using the correct key of the recipient when encrypting a message. A trust centre can additionally issue certificates for electronic signatures to certify the identity of a communication partner.

In one variant, a message deliverer can act as a complete provider for secure message transmission. The applicant provides such a process with the E-Postbrief for example. Both the recipient and the sender then require only one contract with the message deliverer and they are provided with all necessary functions for secure communication. A trust centre can at the same time create a key for a user which is then managed by the message deliverer. A sender can obtain the required keys from the message deliverer and also deliver messages there. In order that no technical or organisational measures are required at all on the part of the recipient, the encrypted messages can already be decrypted on the part of the message deliverer on a server of the message deliverer when the message is retrieved by the recipient and transmitted to the recipient via a secure connection. By having high requirements regarding identification of the participants and by providing an address qualification service, the message transmitter can also determine or check, for the sender, the recipient's address and ensure correct delivery.

SUMMARY OF THE INVENTION

One of the objects of the invention consists in supporting the use of a secret key in an alternative way to existing approaches. Another object of the invention consists in enabling a secret key to be used in a particularly user-friendly and, at the same time, particularly secure manner.

These objects are achieved by a method, an apparatus, a program, a storage medium and a system according to the teachings herein.

For a first aspect, it is assumed for an exemplary embodiment of a method, performed by an apparatus of a first installation, that the first installation stores key identifications with allocation to a respective user and that a second installation stores secret keys which each can be found by means of a key identification. The method comprises authenticating a user who logs onto the first installation via a user device. The method further comprises creating a temporary identifier as a basis for retrieving a secret key held ready for the user in the second installation and allocating the identifier to the user. The method further comprises transmitting the identifier to the user device. The method further comprises receiving a request for a key identification from the second installation, wherein the request contains an identifier which was transmitted to the second installation from a user device. The method further comprises determining a user allocated to the received identifier and determining a key identification stored for the determined user. The method further comprises transmitting the key identification to the second installation.

For a second aspect, it is assumed for an exemplary embodiment of a method, performed by an apparatus of a second installation, that the second installation stores secret keys which each can be found by means of a key identification and that a first installation stores key identifications with allocation to a respective user. The method comprises receiving a request for a secret key from a user device together with a temporary identifier. The method further comprises requesting a key identification from the first installation, wherein the received identifier is transmitted. The method further comprises receiving a key identification from the first installation for a user allocated to the identifier in the first installation. The method further comprises determining a secret key based on the received key identification. The method further comprises transmitting the secret key to the user device.

Therefore, the invention makes provision for certain exemplary embodiments that a first installation stores key identifications allocated to a respective user and that a second installation stores keys which each can be located by means of a key identification. A user can firstly log onto the first installation by means of a user device to obtain a secret key. Logging on could be specifically to obtain the secret key but it could also be primarily for a different purpose, such as for retrieving data from the first installation. The first installation authenticates the user, creates a temporary identifier, allocates the identifier internally to the user and transmits the identifier to the user device. The user can be authenticated by the first installation in any appropriate manner, for example by means of a user name entered during the log-in procedure or an entered user address for an electronic mailbox and an entered password. The identifier could be created automatically after the user has been authenticated or only on the basis of other fulfilled conditions. These could be conditions, for example, which show that the user requires a secret key. The allocation of the identifier which has taken place is at least temporarily held available in the first installation. The user device can now itself request a secret key from the second installation by means of the received identifier. When the second installation receives a request for a secret key from the user device together with an identifier, it requests a key identification from the first installation, wherein the received identifier is transmitted. The first installation determines a user allocated to the received identifier, determines a key identification stored for the determined user and transmits the key identification to the second installation. This second installation determines a secret key based on the received key identification and transmits the secret key directly to the user device. After receiving the secret key, the user device can use the key for example for decrypting encrypted data or also—in the case of a key for symmetric encryption—for encrypting data.

A possible advantage of the invention lies in the fact that the user himself does not have to keep a secret key available in the user device. As a result, the user does not need to ensure that the secret key is kept safe from access by others and that it is not lost. In addition, the user can thereby access the same centrally stored secret key possibly via a plurality of devices. At the same time, however, a possible advantage of the invention lies in the fact that the secret key is nonetheless made available to the user. As a result of this, end-to-end encryptions can be supported, for example, since the user device itself can decrypt data encrypted for the user. In addition, as a result of this, in certain exemplary embodiments the same secret key could be used by the user for different applications.

A further possible advantage of the invention lies in the fact that the provision of user data, on the one hand, and the provision of secret keys, on the other hand, are fully separated from one another. In the second installation, it is not known to whom the stored secret keys belong. In the first installation, the secret key is neither stored in plain text nor encrypted and it is also not received there to be simply forwarded. The retrieval of a secret key from the second installation by the first installation is not implemented. Instead, the secret key is transmitted directly from the second installation to the user device. Hereby, the interface between the first installation and the second installation can be particularly securely formed with respect to potential attacks. A further possible advantage of the invention lies in the fact that for the retrieval the key identification is not transmitted to the second installation via the user device, whereby an attack on the second installation could be further impeded.

An exemplary apparatus according to the invention and according to the first aspect comprises means for performing the method according to the invention and according to the first aspect. The apparatus can be, for example, a server or a module for a server of the first installation.

An exemplary apparatus according to the invention and according to the second aspect comprises means for performing the method according to the invention and according to the second aspect. The apparatus can be, for example, a server or a module for a server of the second installation.

The means of the apparatuses according to the first and second aspect could in each case comprise hardware and/or software components. In one exemplary embodiment, the means could just comprise a circuit, in which corresponding functions are implemented via hardware. In another exemplary embodiment, the means could comprise at least one processor and at least one memory with a suitable program.

Thus, for the first and the second aspect, respectively, an exemplary embodiment of an apparatus according to the invention comprises at least one processor and at least one memory, wherein a program comprising program instructions is stored in the memory, and wherein the memory and the program are configured to, with the processor, at least cause the apparatus to perform the method according to the invention according to the first aspect or according to the second aspect, when the program is executed on the processor. The apparatus is, for example, configured softwarewise to be able to execute the method. Configured softwarewise should in particular be understood as the preparation of the apparatus which is necessary in order to be able to execute a method, for example in the form of a program, on the processor.

A processor should, amongst other things, be understood as one or more control units, microprocessors, microcontrol units such as microcontrollers, Digital Signal Processors (DSPs), Application-Specific Integrated Circuits (ASICs) or Field Programmable Gate Arrays (FPGAs).

A memory is, for example, a program memory and/or a main memory of the processor. A program memory should, amongst other things, be understood as a non-volatile memory and a main memory should be understood as a volatile or non-volatile memory, in particular a memory with random access (random access memory RAM) and/or a flash memory. Non-volatile memories are e.g. memories with random access (RAM) such as e.g. NOR flash memories or with sequential access such as e.g. NAND flash memories and/or memories with read-only access (ROMs) such as e.g. EPROM, EEPROM or ROM memories. The memory can be formed as tangible memory for example.

For the first and the second aspect, respectively, an exemplary embodiment of a program according to the invention comprises program instructions, wherein the program instructions cause an apparatus to perform the method according to the invention according to the first aspect or according to the second aspect, respectively, when the program is executed by the processor. A program can be distributed, for example, via a network, such as a local area network, a wide area network, a virtual network, a radio network, such as a mobile radio network, any other telephone network and/or the Internet. A program can at least partly be software and/or firmware of a processor. For example, the program according to the invention is stored according to the first or second aspect in a memory of the apparatus according to the invention. It should be understood that the concept of a program can in each case be understood as a combination of a plurality of programs, too.

For the first and second aspect, respectively, an exemplary embodiment of a storage medium according to the invention stores a program according to the invention according to the first or second aspect. The storage medium is, for example, a computer-readable storage medium which contains the program according to the invention and, for example, is formed as a magnetic, electric, electromagnetic, optical and/or other type of storage medium. The storage medium can in particular be a physical and/or tangible storage medium. The storage medium is, for example, portable or permanently installed in an apparatus. "Computer-readable" should in particular be understood such that the storage medium can be read and/or written to by a computer or a data processing device, for example by a processor. The storage medium is, for example, a program memory of a processor.

In one exemplary embodiment, a system according to the invention comprises a first installation with an embodiment of an apparatus according to the first aspect and a memory configured to store a plurality of key identifications allocated to a respective user. In one exemplary embodiment, a system according to the invention alternatively or additionally comprises a second installation with an embodiment of an apparatus according to the second aspect and a memory configured to store a plurality of secret keys allocated to a respective key identification. The first installation can, for example, be exclusively provided for making available key identifications or can provide other services. Thus, the first installation could, for example, be an installation of a message deliverer or of a database provider. The second installation could, for example, be a trust centre.

In one exemplary embodiment, the apparatus of the first installation can check a validity of a received identifier, wherein a key identification is only determined and transmitted if the validity of the received identifier is established. This can provide the advantage that additional security is obtained. The validity of an identifier can only be given, for example, while the allocated user is still logged onto the first installation and/or as long as a specified period of time since the identifier was created has not been exceeded. If the allocation is deleted in the first installation, as soon as a user has logged off or as soon as a specific period of time has elapsed, then establishing the validity can also implicitly take place, since in that case no user allocated to the identifier and hence also no key identification allocated to the user can be determined any more. Of course, additionally or alternatively, other criteria can also be considered for checking the validity of the identifier.

In one exemplary embodiment of the invention, the first installation can store encrypted data for the user which can be decrypted in the user device by means of a secret key allocated to the user in the second installation. Access to this data in the first installation can be enabled for the user, for example, after the previously mentioned authentication or after a preceding or subsequent separate authentication.

The invention can be particularly advantageous for this embodiment, since here the provision of data and the provision of a secret key for decrypting the data can also be completely separated from one another. For particularly confidential information, there can be particularly high requirements on ensuring that only the intended recipient can use the provided information. This can, for example, relate to professional confidentiality of certain professional groups, such as doctors or lawyers, who are subject to special obligations to maintain confidentiality. By means of the separation between the provision of the data and the provision of the keys, a particularly high level of security regarding confidentiality can be achieved. That is to say, no installation has access both to encrypted data and to the secret key required for the decryption—not even for a short time or in encrypted form.

If the first installation is configured to store data for users which can be at least partly encrypted, then this data can be encrypted for the user by a third party device and made available to the first installation or encrypted by a device of the user and made available to the first installation.

The secret key could be stored unencrypted in the second installation, since here no allocation of the secret keys to a respective user is stored. However, encryption of the secret keys provides an even higher level of security, since a key which is read unauthorised cannot be directly used. The secret key stored in the second installation could, for example, be encrypted with a password which is based on a user input. The secret key could then be transmitted in the encrypted form to the user device, where the password could be regenerated by means of a user input and used to decrypt the secret key. For this purpose, the user must remember the user input for each retrieval of the secret key.

In another exemplary embodiment, the secret keys are stored in the second installation encrypted with the associated key identification, wherein the secret key determined based on the key identification is a secret key encrypted with the key identification. The apparatus of the second installation can then decrypt the encrypted secret key with the received key identification, wherein the transmission of the secret key to the user device comprises a secure transmission of the decrypted secret key.

The transmission can be protected in any appropriate manner. For example, the communication path between the apparatus of the second installation and the user device could be protected as a whole, for example by using a TLS (Transport Security Layer) connection. Additionally or alternatively, the secret key could be encrypted with a password known to the user device before transmission.

In one exemplary embodiment, the apparatus of the second installation can, for secure transmission of the decrypted secret key, encrypt the decrypted secret key with a one-time password received from the user device, this one-time password being encrypted with a public key of a key pair of the second installation, wherein the received encrypted one-time password is decrypted with a private key of the key pair of the second installation before it is used for encrypting the decrypted secret key of the user. The transmission of the secret key to the user device can then comprise a transmission of the secret key encrypted with the one-time password. The use of a one-time password can take place without user input and hence be particularly convenient for the user.

In one exemplary embodiment, the secret keys are stored in the second installation allocated to a cryptographically derived value of a respective key identification, wherein determining a secret key based on the received key identification comprises cryptographically deriving a value of the received key identification and determining a secret key which is stored with allocation to the cryptographically derived value. Storing the encrypted secret key with allocation to a cryptographically derived value of the key identification can provide the advantage that the secret key still cannot be easily retrieved from a memory of the second installation only with the knowledge of the key identification. An example of a cryptographic derived value is a hash value (or hash) which is obtained from the key identification by means of a hash function. A perfect hash function can be used as a hash function, for example, so that a different hash value is produced for each possible key identification.

The user's secret key can, for example, be a key for symmetric encryption or, for example, the private key of a key pair for asymmetric encryption.

Further advantageous exemplary embodiments of the invention can be derived from the following detailed description of some exemplary embodiments of this invention, in particular in conjunction with the figures. The figures, however, are only to serve for the purpose of clarification and not for determining the scope of protection of the invention. The figures are not drawn to scale and are only supposed to reflect the general concept of this invention by way of example. In particular, features contained in the figures are in no way to be considered as mandatory integral parts of this invention.

DETAILED DESCRIPTION OF THE INVENTION

This invention is described below by means of exemplary embodiments which support a use of secret keys.

Figure 1:
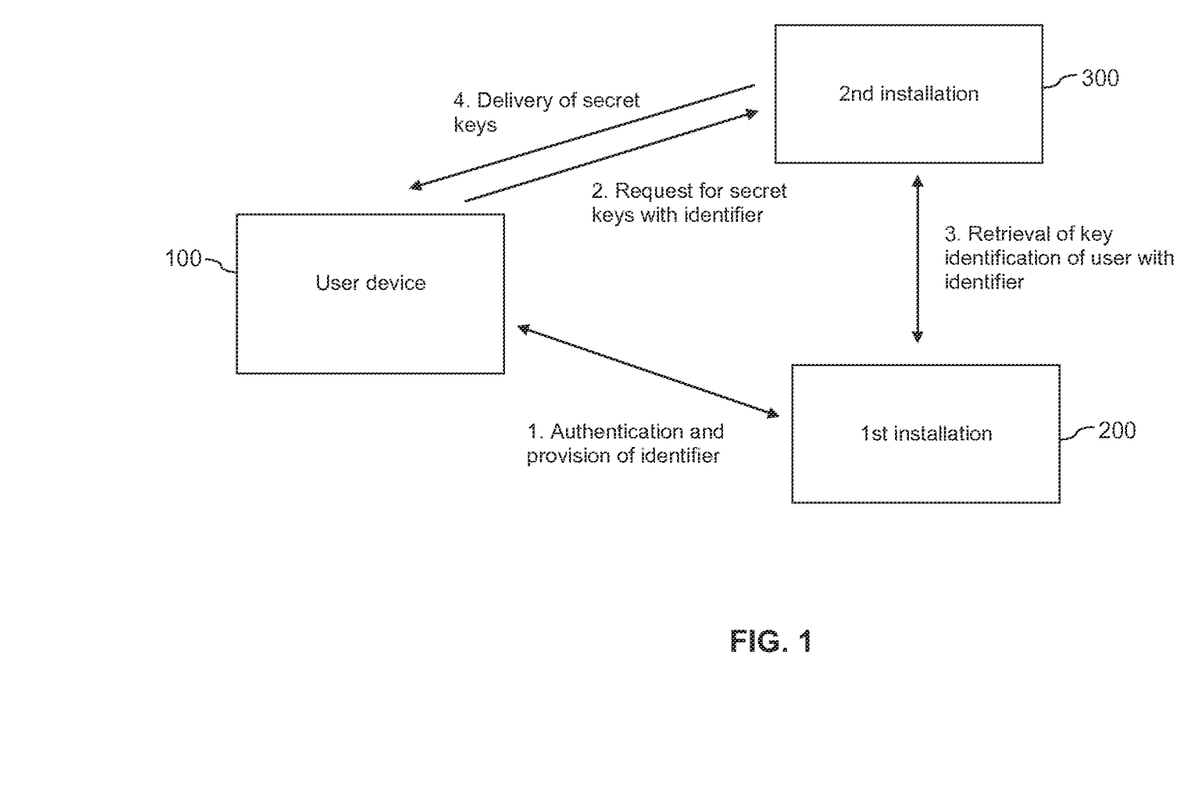
FIG. 1 shows a schematic overview of an exemplary embodiment of a system according to the invention.

FIG. 1 shows a schematic overview of an exemplary embodiment of a system according to the invention. The system comprises a user device 100, a first installation 200 and a second installation 300.

In the system, a secret key is allocated to the user of the user device 100. The secret key could, for example, be a key for symmetric encryption, in which data is encrypted and decrypted based on the same secret key. Alternatively, the secret key could, for example, be a private key of a key pair for asymmetric encryption, in which data is encrypted with a public key of a key pair, but can only be decrypted with the corresponding private key of the key pair.

The secret key is, however, not stored in the user device 100, but rather only in the second installation 300. The key in the second installation 300 is not directly allocated to the user, but rather only to a key identification or a derivation of a key identification.

The key identification allocated to the user is not stored in the user device 100 either, so that a direct retrieval of the secret key from the second installation by the user device 100 is not possible. An allocation of key identifications to users is stored in the first installation 200.

If the user now requires his secret key, for example to decrypt encrypted data, then he firstly has to authenticate himself at the first installation 200. Subsequently, an apparatus of the first installation 200 generates a temporary identifier and makes it available to the user device 100. In addition, the apparatus of the first installation 200 ensures that an allocation between the temporary identifier and the user is stored in the first installation 200.

Using the received identifier, the user device 100 can now request the secret key from the second installation 300.

An apparatus of the second installation 300 subsequently tries to retrieve the key identification for the user from the first installation 200 by means of the received identifier. The apparatus of the first installation 200 determines to which user the identifier is allocated. Then it selects the key identification for the associated user and transmits it to the second installation 300.

On the basis of the key identification, the apparatus of the second installation 300 can now identify the user's secret key and make it available to the user device 100.

The first installation 200 could optionally additionally provide data for the user, which can be at least partly encrypted. This, however, is not absolutely necessary. The user could also store encrypted data in the user device 100, for example, or in a memory which can be connected to the user device 100 or obtain the encrypted data directly from a third party via a communications network.

Figure 2:
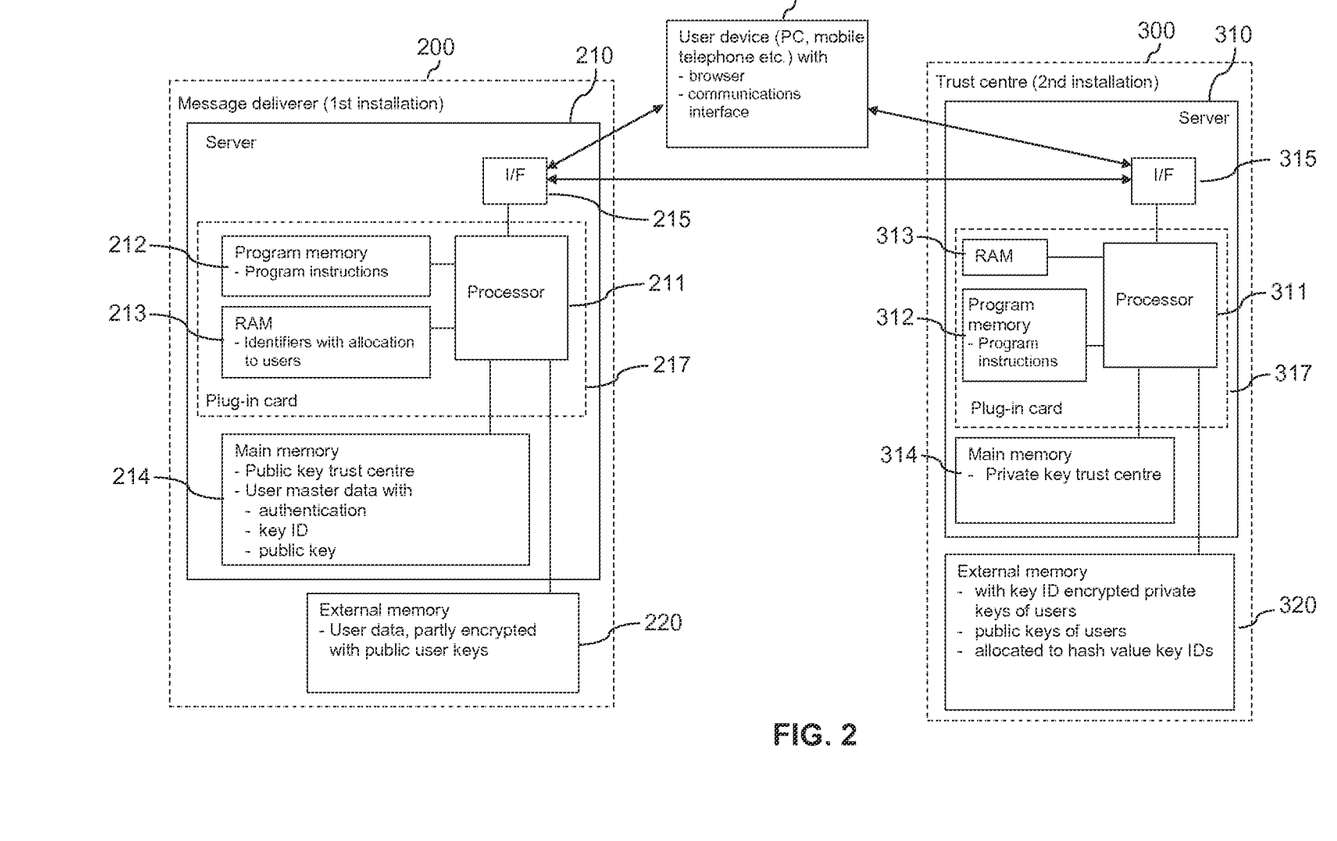
FIG. 2 shows a schematic block diagram with exemplary details of the system from FIG. 1.

FIG. 2 shows a block diagram with exemplary details of the system from FIG. 1. The user device 100, the first installation 200 and the second installation 300 have the same reference signs as in FIG. 1.

Here, the user device 100 is, by way of example, a personal computer (PC), a notebook, a tablet computer, a mobile telephone or any other device which has a browser and a communications interface. The communications interface can be any interface which enables data to be exchanged between the user device 100 and the first installation 200 and the second installation 300, in particular, but not necessarily, via the Internet. It can be a wireless interface which enables access to the Internet, for example via a Wireless Local Area Network (WLAN) or via a mobile radio network. It can also be a wired interface which enables access to the Internet via a cable, such as via a DSL connection or a Local Area Network (LAN).

Here, the first installation 200 is, by way of example, an installation of a message deliverer.

The installation 200 comprises a server 210 and an external memory 220.

The server 210 comprises a processor 211 and, connected to the processor 211, a program memory 212, a working memory 213 designed as RAM, a main memory 214 and a communications interface (I/F) 215.

The program memory 212 is a storage medium which permanently stores programs which are provided for operating the server 210; i.e. usually until they are deleted by an administrator. A program could in particular also comprise data for a website provided by the message deliverer. A program comprises program instructions to support the use of a secret key.

The working memory 213 is designed to temporarily store various information.

The main memory 214 is designed to store user master data. User master data can be created for a user if a user would like to use a service for transmitting electronic messages provided by the message deliverer and for that reason makes a request at the message deliverer for the use of a portal to be enabled. The message deliverer enables the use of the portal if all specified conditions are met and creates a user master data record for the user. It can, for example, contain data for authenticating the user, such as a user name and/or a message delivery address and a password. A key identification (key ID) and a public key of a key pair can also be stored as part of the user master data. In addition to the user master data, the main memory 214 could, for example, store a public key of the second installation 300.

The program memory 212 or the main memory 214 of the server 210 also stores an application which can be downloaded from the server 210 and executed in each case by a user device 100 via a browser on demand. Such an application could, for example, be implemented as a Java applet and supports the use of a secret key on the part of the user device 100.

The processor 211 is designed to execute programs from the program memory 212 and thereby to cause the first installation 200 or the server 210 of the first installation 200 to perform out certain actions. In so doing, any information can be stored temporarily in the working memory 213 by the processor 211.

The processor 211 could be a microprocessor. It could also be embedded in an integrated circuit (IC), for example together with a memory. A plug-in card 217 is indicated by way of example. Such a component could contain a circuit with the processor 211, the program memory 212 and the working memory 213.

The communications interface 215 can be any interface which enables data to be exchanged between the first installation 200 and user devices, on the one hand, and between the first installation 200 and the second installation 300, on the other hand, for example, but not necessarily, via the Internet. It can be a wireless interface or a wired interface. Of course, two different interfaces can also be provided for communication with user devices and with the second installation 300.

The external memory 220 can be designed to store data of a database. The database can, for example, provide mailboxes for electronic messages for different users. Attachments can optionally be stored separately. These can be encrypted or unencrypted. If they are encrypted, when correctly encrypted they are encrypted with the public key of a key pair of the mailbox user.

The program for supporting the use of a secret key in the program memory 212 could be an exemplary embodiment of a program according to the first aspect of the invention, the program memory 212 could be an exemplary embodiment of a computer-readable storage medium according to the first aspect of the invention and the server 210 or the plug-in card 217 could be an exemplary embodiment of an apparatus according to the invention according to the first aspect.

Of course, the installation 200 can also be arranged in any other suitable manner Thus, the memory 220 could also be integrated in the server 210 or the main memory 214 and the external memory 220 could be combined either within the server 210 or outside the server 210. The external memory 220 could also be provided by another server.

The second installation 300 can, for example, be a state-certified trust centre.

The installation 300 also comprises a server 310 and an external memory 320.

The server 310 also comprises a processor 311 and, connected to the processor 311, a program memory 312, a working memory 313 designed as RAM, a main memory 314 and a communications interface (I/F) 315.

The program memory 312 is a storage medium which permanently stores programs with program instructions which are provided for operating the server 310. They comprise a program with program instructions to support the use of a secret key. The programs could also, for example, comprise a program for generating a key pair for asymmetric encryption. The working memory 313 is designed to store information temporarily. The main memory 314 is designed to store a private key of a key pair of the trust centre 300.

The processor 311 could be a microprocessor. It could also be embedded in an integrated circuit, for example together with a memory. A plug-in card 317 is indicated by way of example which contains a circuit with the processor 311, the program memory 312 and the working memory 313.

The processor 311 is designed to execute programs from the program memory 312 and thereby cause the first installation 300 to carry out certain actions. In so doing, any information can be stored temporarily in the working memory 313 by the processor 311.

The communications interface 315 can be any interface which enables data to be exchanged between the second installation 300 and user devices, on the one hand, and between the second installation 300 and the first installation 200, on the other hand, for example, but not necessarily, via the Internet. It can be a wireless interface or a wired interface. Of course, two different interfaces can also be provided for communication with user devices and with the first installation 200.

The external memory 320 can be designed to store data of a database. The database can be designed in such a way that in each case a data record can be accessed via a hash value of a key identification. The data allocated to a hash value comprises a public key and a private key encrypted with the key identification, wherein the public key and the private key form a key pair for a specific user. The private key is an exemplary secret key of a user. The user cannot be identified in the installation 300.

A key pair and an associated unique key identification for a respective user could, for example, be generated by the trust centre 300 itself without specifications by the user or the message deliverer and processed to produce the encrypted private key and the hash value. This could occur at a respective request by the server 210, for example when a portal is enabled for a newly registered user at the message deliverer. Alternatively, the request could in each case occur though a user device of a user. It could be generated by an application running in the browser of the user device, which is made available to the user device by the installation 200 after a newly registered user has logged on for the first time. The key identification and the public key of the key pair could then be made available to the server 210 in each case directly or via the respective user device, where they can be stored in the main memory 214 as part of the user master data. The plain text of the generated private key and the plain text of the generated key identification are deleted in the trust centre 300.

The program for supporting the use of a secret key in the program memory 312 could be an exemplary embodiment of a program according to the second aspect of the invention, the program memory 312 could be an exemplary embodiment of a computer-readable storage medium according to the second aspect of the invention and the server 310 or the plug-in card 317 could be an exemplary embodiment of an apparatus according to the invention according to the second aspect.

Of course, similar as to what was explained for installation 200, the trust centre 300 can also be arranged in any other suitable manner.

The installations 200 and 300 from FIG. 2 can be generally modified in various ways, both by omitting components and by adding or modifying components. Further or alternative advantages can thereby result.

The functions of the installation 200 of the message deliverer could, for example, be implemented in the applicant's E-POSTBRIEF system; the functions of the trust centre 300 could, for example, be implemented in the applicant's Signtrust system which is separate from it; and the electronic messages could be E-Postbriefe (electronic letters) which can be stored by a sender on a web portal of the E-POSTBRIEF system and retrieved by a recipient there.

Figure 3:
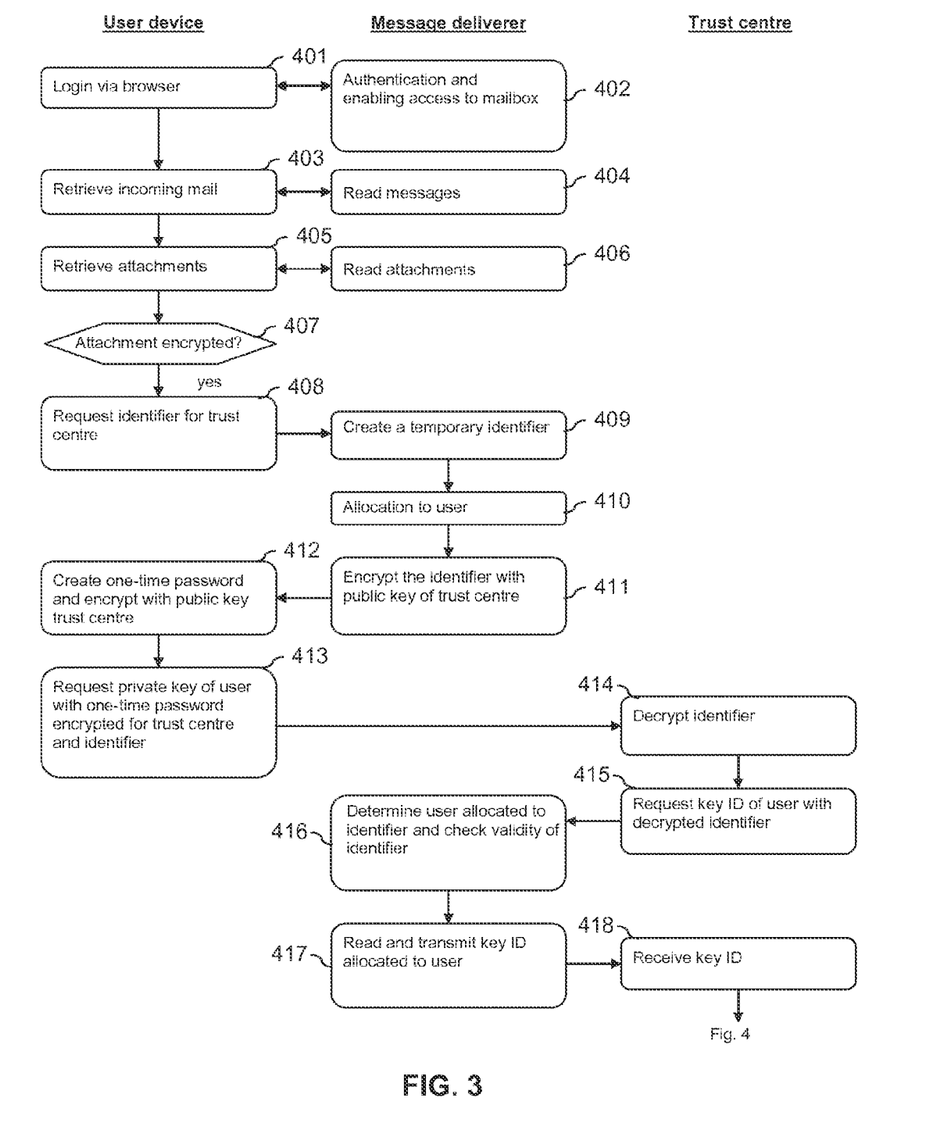
FIG. 3 shows a flowchart with first exemplary method steps in the system from FIG. 2.
Figure 4:
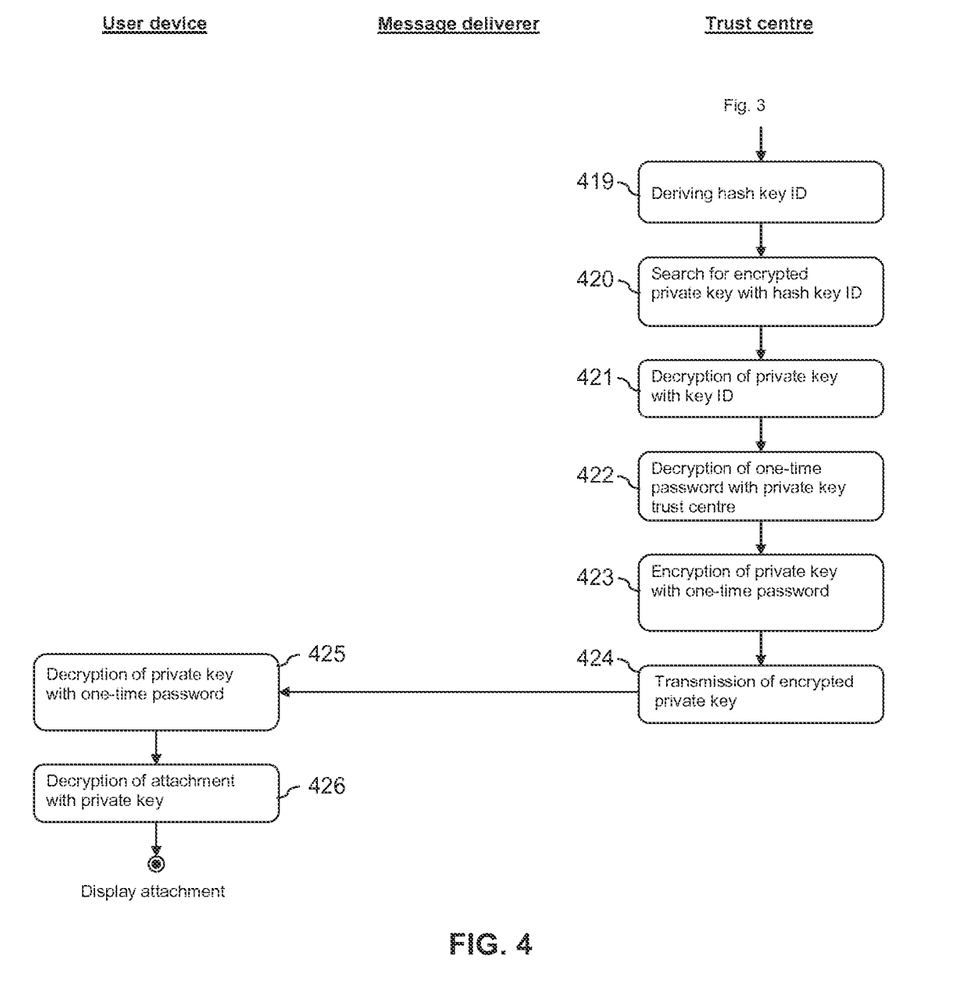
FIG. 4 shows a flowchart with further exemplary method steps in the system from FIG. 2.

FIGS. 3 and 4 show flowcharts which illustrate exemplary embodiments of methods according to the invention according to the first and second aspects, which enable a user to obtain a secret key. FIG. 4 is the continuation of FIG. 3.

The shown actions of the user device 100 are carried out, by way of example, when the user device 100 calls up a website of the message deliverer via the browser and the user device 100 executes an application loaded via the browser. Such an embodiment can be particularly convenient for the user, since the user does not have to install and update any programs on the user device 100. In this way, the message deliverer can also possibly act as a complete service provider, so that the user only requires a contract with the message deliverer and requires no separate contract with the trust centre 300. The shown actions of the installation 200 of the message deliverer are carried out when the processor 211 retrieves and executes a corresponding program from the program memory 212. The shown actions of the trust centre 300 are carried out when the processor 311 retrieves and executes a corresponding program from the program memory 312. The illustrated communications between the user device 100, the installation 200 of the message deliverer and the trust centre 300 occur via the respective communications interface using the Internet.

If a sender wants to transmit an electronic message with an encrypted attachment to the user of the device 100, then the sender can request the public key of the user from the installation 200. The installation 200 can read the public key of the user, for example by means of a specified user name or a specified delivery address for the user in the user master data, from the main memory 214 and make it available to the sender. The sender can then encrypt a file with the public key of the user, attach it to the message and transmit the message with user addressing to the message deliverer. The data encrypted with the public key of the user can now only be decrypted again using the private key of the user.

All electronic messages, independent of the type of delivery and their contents, are allocated within the installation 200 of the message deliverer to the recipient mailbox and are filed access-protected in the memory 220.

If now, a user would like to retrieve incoming mail he can log onto the installation 200 of the message deliverer via a browser of the user device 100 (Action 410). The log-in can, for example, comprise the input and transmission of a user name and/or a user delivery address and a password.

The installation 200 subsequently carries out a user authentication (Action 402). The authentication can be based on the user master data stored in the main memory 214. For example, the installation 200 could check whether there is a data record for the transmitted user name in the user master data and whether a password is stored for it which corresponds to the transmitted password. After the user has been successfully authenticated, the installation 200 enables the user to access his mailbox in the memory 220. Access enabling can be effected, for example, by the installation 200 generating an authentication token and transmitting it to the user device 100.

As long as the user remains logged on at the message deliverer, the user device 100 can now retrieve the mail for the user at the installation 200, for example by transmitting the respective authentication token (Action 403).

The installation 200 then reads all new messages for the user in the memory 220 and transmits them to the user device 100 (Action 404). There, the messages can be displayed.

Attachments could be directly read at the same time by the installation 200 and transmitted. Alternatively, provision can be made for the user to arrange for the user device 100 to retrieve the attachments of the displayed messages separately as required (Action 405). In this case, the installation 200 only then reads the selected attachments from the external memory 220 and transmits them to the user device 100 (Action 406).

The user device 100 now checks whether one of the received attachments is encrypted (Action 407). If this is not the case, then the content of the attachment can be immediately output, for example via a computer screen, if the content is text and/or image data.

If the attachment is encrypted, however, then the user device 100 firstly requires the user's private key to decrypt it. This is not stored in the user device 100.

To that end, the user device 100 requests an identifier from the installation 200 of the message deliverer, specifically for retrieving the private key from the trust centre 300.

The installation 200 subsequently issues a temporary identifier (Action 409).

The installation 200 allocates the user to the identifier and stores the allocation, for example in the working memory 213 (Action 410). The user can, for example, be identified via a user name or a user delivery address. The user could, however, also be identified via a separate index, to which the user master data could be allocated in the main memory 214.

In order to ensure that the identifier can only be used by the trust centre 300, the installation 200 encrypts the identifier with the public key of the trust centre 300 stored in the main memory 214 and transmits the encrypted identifier and the public key of the trust centre 300 to the user device 100 (Action 411).

The user device 100 receives the identifier, generates a random key for symmetric encryption as a one-time password and encrypts it with the public key of the trust centre 300 (Action 412). The one-time password can be automatically generated and encrypted without involvement of the user. The unencrypted one-time password is held available in a working memory of the user device 100.

The user device 100 now requests the user's private key from the trust centre 300 and transmits the encrypted identifier and the encrypted one-time password to the trust centre 300 for this purpose (Action 413).

The trust centre 300 decrypts the received identifier, which is encrypted with the public key of the trust centre 300, by means of the private key of the trust centre 300 stored in the main memory 314 (Action 414).

Using the decrypted identifier, the trust centre 300 then requests the key identification of the user at the installation 200 of the message deliverer (Action 415).

The installation 200 determines whether a corresponding identifier is stored in the working memory 213 and is allocated to a user (Action 416). The validity of the received identifier can also be checked in various ways. For example, an identifier issued in Action 409 could in each case only be valid for a specified period of time and/or only as long as the user is logged onto the installation 200. As soon as the specified period of time has elapsed and/or the user has logged off, the allocation between the identifier and the user could be deleted from the working memory 213. If then, a received identifier is not found in the working memory 213—whether this is because it was never there or whether this is because it has meanwhile been deleted—then it is not valid. Alternatively, the allocation could also only be deleted when the user logs off. Then, the allocation could additionally contain an indication of the creation time of the identifier or the identifier itself could contain an indication of its creation time. For the identifier to be valid, the indicated time should then, for example, not lie further back than a specified time interval. A further alternative is that the allocation between the identifier and the user might not be automatically deleted when the user logs off. In this case, after identifying an allocated user, it could be separately checked whether the user is still logged on. If this is not the case, the identifier is treated as invalid. If an identifier is treated as invalid, then the trust centre 300 can optionally be informed about this and the trust centre 300 can, in turn, optionally output an error message to the user device 100 and terminate the operation.

If a user allocated to the identifier could be identified and if—as the case may be—the identifier has been deemed valid, then the installation 200 reads a key identification allocated to the user in the user master data in the main memory 214. This key identification is then transmitted to the trust centre 300 (Action 417).

Of course, the described use of an identifier is only schematic and can be modified and refined in various ways. In practice, the identification of a user at the trust centre 300 could, for example, take place by means of an authentication token in a form used in OAuth. The use of OAuth could be advantageous, since it is an open protocol which enables a standardised authorisation for a limited access to an http service and at the same time guarantees a high level of security. However, other technical methods can also be used.

The trust centre 300 receives the key identification (Action 418) and derives from it a hash value using a hash function (Action 419).

The trust centre 300 identifies an encrypted private key which is allocated to the hash value in the memory 320 (Action 420).

The trust centre 300 decrypts the encrypted private key with the received key identification (Action 421).

The trust centre 300 also decrypts the encrypted one-time password received from the user device 100 with the private key of the trust centre 300 (Action 422).

The trust centre 300 can now encrypt the decrypted private key of the user with the decrypted one-time password again (Action 423).

The re-encrypted private key of the user is now transmitted from the trust centre 300 to the browser of the user device 100 (Action 424). The one-time password therefore serves as a transport-PIN (Personal Identification Number) for secure transmission of the secret key from the trust centre 300 to the user device 100.

All intermediate data, in particular the key identification and the plain text of the private key of the user are deleted again from the working memory 313 of the trust centre 300.

The user device 100 receives the encrypted private key of the user and decrypts it within the browser with the stored one-time password (Action 425). The private key of the user now exists in plain text in the browser.

Finally, the user device 100 can decrypt the retrieved, encrypted attachment with the private key of the user in the browser (Action 426) and—depending on the user specification—can store it and/or output it via a user interface, for example by displaying it on a computer screen.

The one-time password, the encrypted attachments and the private key of the user can be automatically deleted in the user device 100 by the application running in the browser if all existing encrypted attachments have been decrypted and/or if the user logs off from the message deliverer via the browser.

Apart from the user logging onto the message deliverer, the method from FIGS. 3 and 4 could take place without any input from a user. It could be carried out completely non-transparently and automatically. That is to say, the user would not be able to recognise whether an electronic message had an unencrypted attachment or an encrypted attachment. However, in order to indicate to the user the distinctiveness of the received message and boost confidence in the method, provision can be made to make the decryption procedure and its outcome clearly visible to the recipient.

The actions of the installation 200 of the message deliverer in FIG. 3 represent an exemplary embodiment of a method according to the first aspect of the invention. The actions of the trust centre 300 in FIGS. 3 and 4 represent an exemplary embodiment of a method according to the second aspect of the invention.

In exemplary embodiments of the invention, the storage of the secret key in the trust centre 300 is therefore anonymous. Here, the allocation of a key to a user is not known and with the use of a hash function or another cryptographic derivation even the allocation of a key identification to an encrypted private key exists only temporarily. Reconstructing the key identification locally in the trust centre 300 and hence decrypting the private keys of users is not possible. In addition, the private key (in encrypted form) is exclusively stored in the trust centre 300. Thus, key administration and data storage are fully separated from one another, so that it is guaranteed that no party independently obtains access to keys and data.

Additionally, all data both in the installation 200 of the message deliverer and in the trust centre 300 can be stored encrypted throughout with additional system keys, so that a hacker would also have to gain control of these. In the browser of the user device 100, in certain embodiments there is no data persistence at all. This means that a potential hacker would also here only be able to access data in the browser during runtime. For the actual transmission of data in the system, any other security measures can be provided for each of the connections, such as a secure data transmission by means of the Transport Layer Security (TLS) protocol in the scope of a HyperText Transfer Protocol Secure (HTTPS) application.

Planning and organisational measures are not required by the recipient, since all required means can be provided via a browser.

Since the private key is retrieved by means of a one-time password as a transport-PIN, which is generated independently of a user password, the approach is also independent of the login procedure used, by which a user logs onto the first installation. This means that no measures have to be provided, so that the user password, which during the login is ultimately transmitted to the message deliverer, is firstly modified in such a way that the message deliverer can draw no inferences about the transport-PIN.

Of course, the illustrated and described methods can be modified in various ways within the scope of the invention, by adding, omitting, varying and exchanging individual actions. Thus, for example, the decryption in Action 422 could take place at any time between Action 413 and Action 423. Furthermore, the use of hash values could be dispensed with, for example. The key identification could then be used in Action 420 in plain text to search for the private key. Furthermore, instead of using a one-time password as the transport-PIN any other measure could also be employed to securely transmit the private key of the user from the trust centre 300 to the user device 100. In addition, the method can not only be used for attachments of electronic messages. It could also be used when the message itself is to be encrypted.

The approach presented here by way of example, could also be used for services other than a message delivery service. A first installation—similar to the installation 200—could, for example, belong to a database provider which stores data for users on the net. In this case, a first installation—for example a trust centre again—could optionally instead of a private key of an asymmetric key pair for a user also hold a symmetric key as a secret key for retrieval. The retrieval can take place in essentially the same way as illustrated in FIGS. 3 and 4. The provision of a public key for the user can then possibly be dispensed with. The user device could then each time when stored encrypted data is read retrieve the key for symmetric encryption stored in the second installation, in order to decrypt the data in the user device. This can take place in essentially the same way as illustrated in FIGS. 3 and 4. Here, instead of messages and attachments, only data is retrieved by the user device from a memory in the second installation and instead of the private key of the user a key of the user for symmetric encryption is used. The user device could then also each time when data for storing in the second installation is to be encrypted firstly retrieve in an analogue manner the key stored in the first installation for symmetric encryption of the data.

The illustrated or described connections between components are to be understood as functional connections. They can be achieved directly or indirectly via a plurality of other components. The described actions can be implemented in a variety of ways; thus implementation is conceivable not only in software terms (by means of program instructions) but also only in hardware terms or in terms of a combination of the two. Each of the illustrated components can also be formed by a plurality of components. Thus, instead of each processor a plurality of processors could also be used and instead of each memory component a plurality of memory components could be used. A plurality of processors and/or a plurality of memory components could also be distributed on a plurality of servers of a respective installation.

Of course, the described embodiments are only examples which within the scope of the claims can be modified and/or supplemented in various ways. In particular, each feature which has been described for a certain exemplary embodiment can be used independently or in combination with other features in any other exemplary embodiment. Each feature which has been described for an exemplary embodiment of a certain category can also be correspondingly used in an exemplary embodiment of another category.

The invention claimed is:

1. A method performed by an apparatus of a first installation, which stores key identifications with allocation to a respective user, wherein a second installation stores secret keys which each can be found by means of a respective key identification, the method comprising:
   authenticating a user who logs onto the first installation via a user device,
   creating a temporary identifier as a basis for retrieving a secret key held ready for the user in the second installation and allocating the temporary identifier to the user,
   transmitting the temporary identifier to the user device,
   receiving a request for a key identification from the second installation, wherein the request contains the temporary identifier which was transmitted to the second installation from the user device,
   determining the user allocated to the received temporary identifier and determining the key identification stored for the determined user, and
   transmitting the key identification to the second installation.

2. The method according to claim 1, further comprising:
   checking a validity of the received temporary identifier, wherein the key identification is only identified and transmitted if the validity of the received temporary identifier is established.

3. The method according to claim 1, wherein the first installation stores encrypted data for the user which can be decrypted in the user device by means of the secret key allocated to the user in the second installation, the user device being separate from the first installation, and wherein access to the data in the first installation is enabled for the user after the authentication or after a separate authentication.

4. The method according to claim 3, wherein the encrypted data one of
   was encrypted by a third party device and made available to the first installation and
   was encrypted by a device of the user and made available to the first installation.

5. An apparatus of a first installation, which stores key identifications with allocation to a respective user, wherein a second installation stores secret keys which each can be found by means of a respective key identification, the apparatus comprising at least one processor and at least one memory storing a program, wherein the at least one memory and the program are configured to, with the at least one processor, cause the apparatus to perform the following:
   authenticate a user who logs onto the first installation via a user device,
   create a temporary identifier as a basis for retrieving a secret key held ready for the user in the second installation and allocating the temporary identifier to the user,
   transmit the temporary identifier to the user device,
   receive a request for a key identification from the second installation, wherein the request contains the temporary identifier which was transmitted to the second installation from the user device,
   determine the user allocated to the received temporary identifier and determining the key identification stored for the determined user, and
   transmit the key identification to the second installation.

6. The apparatus according to claim 5, wherein the at least one memory and the program are further configured to, with the at least one processor, cause the apparatus to:
   check a validity of the received temporary identifier, wherein the key identification is only identified and transmitted if the validity of the received temporary identifier is established.

7. The apparatus according to claim 5, wherein the first installation stores encrypted data for the user which can be decrypted in the user device by means of the secret key allocated to the user in the second installation, the user device being separate from the first installation, and wherein access to the data in the first installation is enabled for the user after the authentication or after a separate authentication.

8. The apparatus according to claim 7, wherein the encrypted data one of was encrypted by a third party device and made available to the first installation and was encrypted by a device of the user and made available to the first installation.

9. The apparatus according to claim 5, wherein the apparatus is one of a server of a message deliverer and a module for a server of a message deliverer.

10. A non-transitory computer-readable storage medium which stores a program comprising program instructions, wherein the program instructions when executed by a processor cause an apparatus of a first installation, which stores key identifications with allocation to a respective user, to perform the following, wherein a second installation stores secret keys which each can be found by means of a respective key identification:
   authenticate a user who logs onto the first installation via a user device,
   create a temporary identifier as a basis for retrieving a secret key held ready for the user in the second installation and allocating the temporary identifier to the user,
   transmit the temporary identifier to the user device,
   receive a request for a key identification from the second installation, wherein the request contains the temporary identifier which was transmitted to the second installation from the user device,
   determine the user allocated to the received temporary identifier and determining the key identification stored for the determined user, and
   transmit the key identification to the second installation.

11. A method performed by an apparatus of a second installation which stores secret keys which each can be found by means of a respective key identification, wherein a first installation stores key identifications with allocation to a respective user, the method comprising:
   receiving a request for a secret key from a user device together with a temporary identifier,
   requesting a key identification from the first installation, wherein the received temporary identifier is transmitted,
   receiving the key identification from the first installation for the user allocated to the temporary identifier in the first installation,
   determining the secret key based on the received key identification and
   transmitting the secret key to the user device.

12. The method according to claim 11, wherein the secret keys are stored in the second installation encrypted with the respectively associated key identification, and wherein the secret key determined based on the received key identification is the secret key encrypted with the received key identification, further comprising:
   decrypting the determined encrypted secret key with the received key identification, wherein the transmission of the secret key to the user device comprises a secure transmission of the decrypted secret key.

13. The method according to claim 12, further comprising for the secure transmission of the decrypted secret key:
   encrypting the decrypted secret key with a one-time password received from the user device, the one-time password being encrypted with a public key of a key pair of the second installation, wherein the received encrypted one-time password is decrypted with a private key of the key pair of the second installation before it is used for encrypting the secret key of the user, and wherein the transmission of the secret key to the user device comprises a transmission of the secret key encrypted with the one-time password.

14. The method according to claim 11, wherein the secret keys are stored in the second installation with allocation to a cryptographically derived value of the respective key identification, and wherein determining the secret key based on the received key identification comprises cryptographically deriving a value of the received key identification and determining the secret key which is stored with allocation to the cryptographically derived value.

15. An apparatus of a second installation which stores secret keys which each can be found by means of a respective key identification, wherein a first installation stores key identifications with allocation to a respective user, the apparatus comprising at least one processor and at least one memory storing a program, wherein the at least one memory and the program are configured to, with the at least one processor, cause an apparatus to perform the following:
   receive a request for a secret key from a user device together with a temporary identifier,
   request a key identification from the first installation, wherein the received temporary identifier is transmitted,
   receive the key identification from the first installation for the user allocated to the temporary identifier in the first installation,
   determine the secret key based on the received key identification, and
   transmit the secret key to the user device.

16. The apparatus according to claim 15, wherein the secret keys are stored in the second installation encrypted with the respectively associated key identification, and wherein the secret key determined based on the received key identification is the secret key encrypted with the received key identification, the at least one memory and the program are further configured to, with the at least one processor, cause the apparatus to:
   decrypt the determined encrypted secret key with the received key identification, wherein the transmission of the secret key to the user device comprises a secure transmission of the decrypted secret key.

17. The apparatus according to claim 16, wherein for the secure transmission of the decrypted secret key the at least one memory and the program are further configured to, with the at least one processor, cause the apparatus to:
   encrypt the decrypted secret key with a one-time password received from the user device, the one-time password being encrypted with a public key of a key pair of the second installation, wherein the received encrypted one-time password is decrypted with a private key of the key pair of the second installation before it is used for encrypting the secret key of the user, and wherein the transmission of the secret key to the user device comprises a transmission of the secret key encrypted with the one-time password.

18. The apparatus according to claim 15, wherein the secret keys are stored in the second installation with allocation to a cryptographically derived value of the respective key identification, and wherein determining the secret key based on the received key identification comprises cryptographically deriving a value of the received key identification and determining the secret key which is stored with allocation to the cryptographically derived value.

19. The apparatus according to claim 15, wherein the apparatus is one of a server and a module for a server.

20. A non-transitory computer-readable storage medium which stores a program comprising program instructions, wherein the program instructions when executed by a processor cause an apparatus of a second installation which stores secret keys which each can be found by means of a respective key identification to perform the following, wherein a first installation stores key identifications with allocation to a respective user:
- receive a request for a secret key from a user device together with a temporary identifier,
- request a key identification from the first installation, wherein the received temporary identifier is transmitted,
- receive the key identification from the first installation for the user allocated to the temporary identifier in the first installation,
- determine the secret key based on the received key identification, and
- transmit the secret key to the user device.

* * * * *